B. SCHIEFFELIN.

FILTERS.

No. 7,376.

Reissued Oct. 31, 1876.

Witnesses;

L. Atkinson.

Jno H. Manning.

Inventor;

Bradhurst Schieffelin

By A. L. Hamilton

Atty.

UNITED STATES PATENT OFFICE.

BRADHURST SCHIEFFELIN, OF ATLANTICVILLE, NEW JERSEY.

IMPROVEMENT IN FILTERS.

Specification forming part of Letters Patent No. 175,508, dated March 28, 1876; reissue No. 7,376, dated October 31, 1876; application filed July 20, 1876.

*To all whom it may concern:*

Be it known that I, BRADHURST SCHIEFFELIN, of Atlanticville, in the county of Monmouth and State of New Jersey, have invented certain new and useful Improvements on Apparatus for the Filtering of Liquids under Pressure, of which the following is a specification:

This invention relates to that class of apparatus designed for filtering liquids under pressure; and it consists in the peculiar arrangement of two casings or vessels, and in the introduction into the body of the filtering material contained within the inner filtering-vessel of a deflector or diaphragm, for the purpose of deflecting the fluid when it is passing through the filtering material, causing it to permeate every part thereof, all of which, together with details of construction and operation, will be hereinafter fully pointed out and described.

Figure 1:
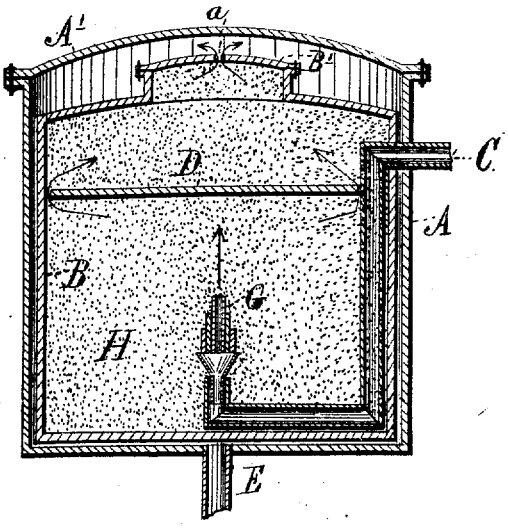
Figure 2:
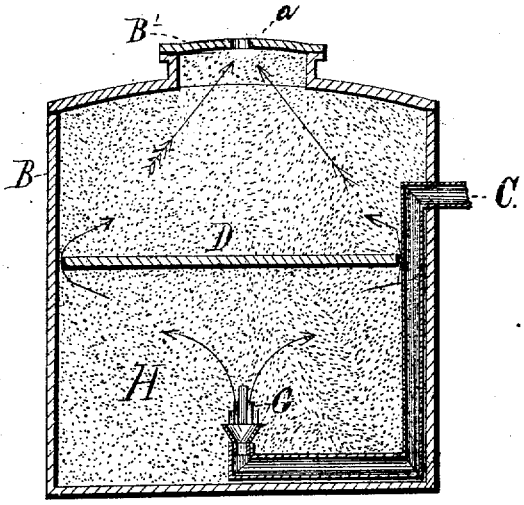

In the drawings, which form an essential part of this specification, Figure 1 represents a vertical section of a liquid-filter in which is fully embodied my invention, and Fig. 2 is a detached sectional view of the inner vessel.

Similar letters of reference found in the two drawings will locate and designate corresponding parts.

The object of this invention is the construction of an apparatus for filtering liquids under pressure, and so arranged and constructed with relation to its interior organization that the liquid, when introduced under pressure, is caused to avoid all tendency toward direct currents, and is forced to thoroughly permeate every part of the filtering material before making its exit therefrom in a purified state. I accomplish such an effect by the introduction within the body of the filtering material of a deflector, diaphragm, or plate placed across the filtering-vessel at any suitable or desired height therein. This deflector is usually of less diameter than that of the vessel, and is held in its position by means of the filtering material into which it is set.

The construction of a filter consisting of a double vessel is shown in Fig. 1, in which case A represents the outer vessel or casing, formed of material capable of resisting great pressure. It is provided with a removable top, A′, which may be fastened thereto by any of the mechanical means usually adopted for that purpose, which, as it forms no part of my invention, need not be specifically described herein. Outside of the casing A is placed a second vessel, B, which is provided at its top, or at any other suitable point, with a removable cap, B′; but there may be placed a third or smaller cover on the larger cover A′, to which might be attached an eduction-pipe. In the cap B′ is formed an opening or perforation, *a*, through which the liquid escapes into the case A. A series of perforations may be made in this cap B′, if so desired, and in order to prevent the escape of the filtering material through such perforations the usual protecting materials for obviating such tendency may be applied; but this being of common usage in all filters, and not an essential part of this invention, requires no detailed description in this specification. The cap B′ may be attached to the vessel B by means of catches that will clasp the flanges of both the cover and vessel and hold them together. C is the induction-pipe, which enters through both of the vessels A and B, and on reaching the center of the vessel, at its base is turned upward at a right angle, and on its top is provided with a distributer, G, which is substantially a wire cage covered with cloth, felt, or some such fabric, so that it need not necessarily present a perforated surface.

It is plainly apparent that many variations of this distributer are readily made, and that any one of the well-known devices used for same purpose will answer perfectly in its stead. D is an adjustable deflector, diaphragm, or plate, inserted within the body of the vessel, as shown, and located within the body of the filtering material, at any desired point therein—ordinarily near the center. This deflector is formed of less diameter than the vessel, so that when inserted in place therein there is a passage between its periphery and the walls of the vessel. It is held in its position by means of the filtering material H, and at any desired point therein, its position being adjusted when the filtering material is being introduced into the vessel. This feature I regard as a strong point and a necessary element, in order to insure the practical operation of pressure-filters of all descriptions, and any colorable modification of its form or situation would not vary the principle involved in my invention; and, while I prefer that the deflector shall be of less diameter than the vessel, and that it be supported by and within the body of filtering material, yet it is obvious that its form may be varied in many ways.

E is the eduction-pipe, which may be placed at any proper location in the case A of the double vessel. In case the cap B′ be provided with a wire or felt or any straining material, it may be provided with a perforated diaphragm to support the wire-gauze or other material which is used to prevent the escape of the charcoal or other material. A safety-valve or a regulating-gage, to indicate the pressure being exerted, may be attached to the filtering-vessel.

The operation of the apparatus is readily seen, and is substantially as follows: The fluid to be purified is forced through the induction-pipe C by means of any suitable forcing process, and is discharged at the bottom of the case B, through the distributer G, into the body of filtering material H, and, by the pressure continually exerted upon it, it is forced upward toward the exit or eduction pipe *a* in the apex of case B. The deflector or diaphragm D, which is located in the body of filtering material, prevents a direct current or passage, so that the liquid is forced to pass upward around the periphery of the deflector and betwen it and the walls of the vessel. The fluid thence passes through the filtering material above the deflector to the exit-opening *a* in cap B′, into the case A, and thence downward through the filtering material contained therein, between the walls of the two vessels, to the base, whence it is discharged through the eduction-pipe E, which may or may not be provided with a stop-cock.

It may be stated that the vessels A and B may both be filled with the same filtering material, or each vessel may contain different filtering substances. The arrows show distinctly the course pursued by the liquid during the process of filtration, and it will be obvious that the work of purifying must be complete and thorough.

Having thus fully described my invention, what I claim as new, and desire to secure by Letters Patent, is—

1. In an apparatus arranged to filter liquids under pressure, the combination of the following elements: An air-tight or hermetically-sealed vessel, containing filtering material; an induction-pipe; a distributer attached to the induction-pipe; an obstructing deflector or diaphragm of less diameter than the filtering-vessel and sustained in position in the body of, and by, the filtering material; and an eduction-pipe, all combined, arranged, and operating as and for the purposes as herein shown and set forth.

2. The combination of the air-tight vessel B, containing filtering material H, and provided with induction and eduction pipes, for conducting and discharging the liquid, and the deflector D of less diameter than the interior of the vessel and supported by and within the body of filtering material, arranged and operating as and for the purposes as herein shown and set forth.

3. The filter herein described, consisting of an outer casing, A, and an air-tight inner case, B, provided with entry-pipe C, and deflector D, extending across the interior of vessel B, and of slightly smaller diameter, all arranged and constructed substantially as and for the purpose described.

BRADHURST SCHIEFFELIN.

Witnesses:

A. L. MUNSON,

E. G. WARD.